June 24, 1958  E. G. SUNDBERG ET AL  2,840,625
ELECTRODE PLATE SUSPENSION MEANS
Filed Oct. 27, 1954

INVENTORS
ERIK GUSTAV SUNDBERG
and BROR GUNNAR OUSBACK

BY
*Beau, Brooks, Buckley & Beau,*
ATTORNEYS.

United States Patent Office 2,840,625
Patented June 24, 1958

2,840,625
ELECTRODE PLATE SUSPENSION MEANS

Erik Gustav Sundberg, Nol, and Bror Gunnar Ousbäck, Goteborg, Sweden

Application October 27, 1954, Serial No. 465,066

3 Claims. (Cl. 136—79)

It is known to suspend the positive plates of accumulator cells by means of rods of glass or hard rubber threaded through holes in suspension lugs extending from the frame of the plates, the suspension lugs being made in one piece with the plate. In lead-acid batteries they are thus made of lead. The said rods are in turn supported on projections from the negative plates.

It has proved that in this construction a shunt path will easily arise in the accumulator due to the fact that a thin layer of conductive material is deposited on the rods which therefore form short circuiting paths between the suspension lugs on the positive plates and the projections on the negative plates. In lead-acid cells in which the construction described above has hitherto been exclusively used, it is also a considerable disadvantage that they shall not break when subjected to pressure or mechanical stress. As is well known, lead is a very weak constructive metal, and the necessary ample dimensioning of the suspension lugs results in a great increase in weight which is not desirable, and at the same time the relatively high price of the material makes the construction disadvantageous economically.

It is the object of the present invention to eliminate the above mentioned disadvantages. The invention is foremost characterized by the suspension lugs being made of firm insulating material in the form of separate members attached to the frame of the plate.

It has proved that in accumulators provided with suspension means according to the invention the risk of short circuits has been wholly eliminated at the same time as a considerable reduction of weight has been attained.

In an embodiment of the invention the suspension lugs are secured to the frame of the respective plate by means of dovetail shaped recesses and/or projections, holes or the like by means of which the suspension lugs are anchored in the material of the frame of the plate.

Figure 1:
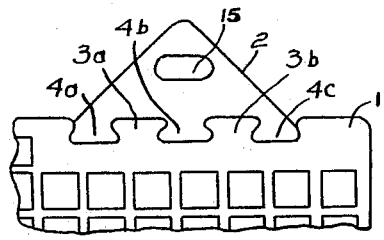
Figure 2:
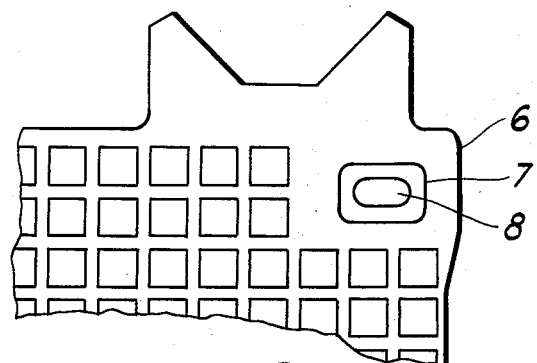
Figure 3:
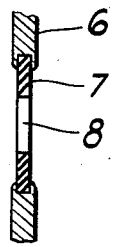

The invention will be described more in particular in conjunction with the accompanying drawing, on which:

Fig. 1 shows an embodiment of the invention.
Fig. 2 shows another embodiment of the invention.
Fig. 3 is a partial section of the device shown in Fig. 2.

In Figure 1 the top portion of a lead plate is designated 1, and 2 is a suspension lug made in accordance with the invention. The latter is made of insulating material which is acid-resisting and has great mechanical strength. It is particularly advantageous to make the suspension lug 2 of thermosetting laminate or a synthetic resin hardening at room temperature, e. g., a polyester resin reinforced with glass wool eventually in the form of a fabric. Such a material has the essential advantage over a thermoplastic material that it is not deformed at the relatively high temperatures which may arise in a battery. Of course, many other materials can be used as for instance hard rubber, glass or the like. At its base lug 2 is formed with a pair of dovetail shaped recesses 3a and 3b and likewise dovetail shaped projections 4a, 4b, and 4c. The lower portion of lug 2 is embedded in the material of plate 1 and affords a very firm connection of the lug to the plate. In the upper portion of the lug 2 there is a hole 5 for suspending the plate on a rod of ebonite, glass or the like as described above.

The fastening of the lug to the plate can be effected either by providing the plate with recesses adapted to the lugs into which the lugs are fitted, or by moulding the lug into the plate preferably at the same time as the plate is moulded. In the first case the recesses adapted to the lug can, of course, be made when the plate is moulded, and if the lug or the portion thereof intended for fastening is made thinner than the plate, a safe fastening can be obtained by applying the material of the plate around the lug.

The fastening can also be effected by riveting the lug to the frame of the plate, or the lug can be made in two pieces one of which is applied to each side of the frame of the plate and which are joined by e. g. riveting, glueing or fusing, etc.

In the other described embodiment shown in Figs. 2 and 3 the suspension lug is attached to the frame of the respective electrode plate at a place where the said frame is provided with a peripherally closed aperture in which the said suspension member is intended to be inserted, the suspension lug being shaped and arranged so that in part it covers or fills up the said aperture in the frame of the electrode plate and so that at least those parts of the lug which are intended to engage the suspension member are located at a certain distance from the edge of the respective aperture in the electrode plate, whereby the suspension member is prevented from coming into contact with the edges of said aperture in the electrode plate.

In Figure 2 a part of an electrode plate 6 of known design is shown. A suspension lug 7 which is made in the form of an insulating plate having a hole 8, is fitted into an aperture in the electrode plate. When the electrode plate is mounted, a suspension member, e. g. in the form of a rod of insulating material such as glass or hard rubber, is passed through hole 8 in the suspension lug 7. The hole 8 is so positioned that its edge is everywhere at a certain distance from the edge of the aperture in the electrode plate, and consequently the suspension member cannot come into contact with the body of the electrode plate. Hereby the risk that electrode material depositing itself on the suspension member may form a short-circuit path to other electrodes of the opposite polarity is reduced.

In Figure 2 only one of the top corners of an electrode plate is shown, and it is assumed that the suspension lug or lining is positioned in this corner. In this case the other corner of the plate should, of course, also be supported in some way when the plate is mounted, and for this purpose a suspension lug similar to suspension lug 2 can be attached to the other top corner of the plate and be fastened to the plate in the same manner.

The material of the suspension lugs preferably consists of a thermosetting plastic or a synthetic resin hardening at room temperature, which is laminated or reinforced e. g. by means of glass wool. A particularly suitable material for the suspension lugs according to the present invention is neoprene rubber. However, other insulating materials may also be used for this purpose.

The shape of the suspension lug 7 and the aperture in the electrode plate can be varied within the scope of the invention. Thus the suspension lug may be provided with an U-shaped recess instead of a hole in which case the suspension lug is fixed at the aperture in the electrode plate in such manner that the innermost part of the recess will be directed upwards and positioned at a certain distance from the edge of the aperture in the electrode plate.

The suspension lug can be fastened to the electrode plate in several different ways. It may for instance be riveted to the frame of the electrode plate. Furthermore, each suspension lug may be made in two equal parts which are attached to either side of the frame of the electrode plate and are interconnected by means of rivets or the like. It is also possible to make the suspension lug in the form of a bushing resembling an eyelet which is placed in the aperture in the electrode plate in a manner known per se.

Another way of attaching the suspension lugs to the electrode plates consists in inserting each suspension lug, which in this case is assumed to be made in the form of an apertured plate somewhat thinner than the electrode plate and having an outer contour equal to the contour of the aperture in the electrode plate, into the aperture, whereupon the electrode plate or at least the part thereof which is located around the aperture, is subjected to pressure so that the material of the electrode plate at the edge of the aperture is extruded to some degree over the suspension lug on either side thereof. The suspension lug will then be fitted into the aperture in the electrode plate as appears from Figure 3 which shows the suspension lug and adjacent parts of the electrode plate in cross section. Since the suspension lug is surrounded on all sides by the electrode material it will be safely anchored in the electrode plate, and the part of the electrode plate which is above the suspension lug will contribute to support the electrode plate when this is suspended on the suspension members.

It will be understood that the invention can be applied to accumulators other than lead-acid accumulators as similar problems arise therein.

Although it has hitherto been common practice to suspend in the manner described above the plates of one polarity and have the suspending rods resting on the plates of the other polarity which in turn are resting on the bottom of the accumulator vessel, it is of course also possible to apply the invention to other constructions, e. g. constructions in which both the positive and the negative plates are suspended from the cover of the battery vessel by the pole bolts. In that case both kinds of plates are preferably provided with suspension lugs according to the invention together with supporting projections, so that those parts of the plates of one plate set which are located farthest away from the pole bridge of the other plate set, have a supporting rod resting on the plates of the lastmentioned plate set adjacent to the pole bridge of these plates and vice versa.

We claim:

1. An electrode plate for storage batteries, said plate comprising an integral assembly of a flat-shaped grid formed of a relatively low strength conductive material having partially imbedded therein a coplaner flat-shaped suspension lug formed of relatively higher strength insulative material with a suspension aperture therethrough, marginal edge portions of said lug being embraced within adjacent jaw-shaped marginal edge portions of said grid, said lug being thereby anchored in coplaner extending relation with said grid.

2. An electrode plate according to claim 1, wherein said suspension lug includes at a marginal edge portion thereof a dovetail shaped configuration interlocking with a complimentarily shaped marginal edge portion of said grid.

3. An electrode plate according to claim 1, wherein said suspension lug is of generally annular washer-shaped form.

References Cited in the file of this patent

UNITED STATES PATENTS

| | | |
|---|---|---|
| 417,055 | Logan | Dec. 10, 1889 |
| 769,975 | Wood | Sept. 13, 1904 |
| 1,363,649 | Hubbard | Dec. 28, 1920 |
| 1,416,788 | Carpenter | May 23, 1922 |
| 1,675,321 | Ambruster | July 3, 1928 |

FOREIGN PATENTS

| | | |
|---|---|---|
| 611,800 | France | Sept. 30, 1930 |
| 169,465 | Germany | Oct. 1, 1934 |

OTHER REFERENCES

Hackh's Chemical Dictionary, 3rd edition, page 664, 1950.